(12) United States Patent
Luciani et al.

(10) Patent No.: US 7,210,058 B2
(45) Date of Patent: Apr. 24, 2007

(54) METHOD FOR PEER-TO-PEER SYSTEM RECOVERY

(75) Inventors: David Luciani, Tucson, AZ (US); Jyoti K. Shah, Morrisville, NC (US); William H. Travis, Tucson, AZ (US)

(73) Assignee: International Business Machines Corporation, New Orchard Armonk, NY (US)

( * ) Notice: Subject to any disclaimer, the term of this patent is extended or adjusted under 35 U.S.C. 154(b) by 566 days.

(21) Appl. No.: 10/674,297

(22) Filed: Sep. 29, 2003

(65) Prior Publication Data

US 2005/0081077 A1   Apr. 14, 2005

(51) Int. Cl.
*G06F 11/00* (2006.01)
(52) U.S. Cl. .......................................... 714/2
(58) Field of Classification Search ................... 714/2, 714/4, 5, 9, 10
See application file for complete search history.

(56) References Cited

U.S. PATENT DOCUMENTS

| | | | |
|---|---|---|---|
| 5,437,022 A | 7/1995 | Beardsley et al. ........... 395/575 |
| 5,566,297 A * | 10/1996 | Devarakonda et al. ........ 714/15 |
| 5,619,644 A | 4/1997 | Crockett et al. ........ 395/183.21 |
| 5,724,501 A | 3/1998 | Dewey et al. .......... 395/182.07 |
| 5,819,310 A | 10/1998 | Vishlitzky et al. ........... 711/114 |
| 5,832,195 A * | 11/1998 | Braun et al. ..................... 714/2 |
| 5,873,103 A | 2/1999 | Trede et al. .................. 707/204 |
| 5,895,493 A | 4/1999 | Gatica ......................... 711/147 |
| 5,924,096 A | 7/1999 | Draper et al. .................. 707/10 |
| 6,052,797 A | 4/2000 | Ofek et al. ...................... 714/6 |
| 6,061,807 A * | 5/2000 | Albert et al. .................... 714/3 |
| 6,065,018 A | 5/2000 | Beier et al. .................. 707/202 |
| 6,128,750 A * | 10/2000 | Espy et al. ...................... 714/7 |
| 6,189,079 B1 * | 2/2001 | Micka et al. ................. 711/162 |
| 6,249,849 B1 | 6/2001 | Day, III et al. ................ 711/61 |
| 6,260,158 B1 * | 7/2001 | Purcell et al. ................. 714/10 |
| 6,266,784 B1 | 7/2001 | Hsiao et al. ..................... 714/6 |
| 6,336,173 B1 | 1/2002 | Day, III et al. .............. 711/161 |
| 6,463,513 B1 | 10/2002 | Bish et al. ................... 711/161 |
| 6,473,829 B1 | 10/2002 | Dahman et al. ............. 711/112 |
| 6,499,091 B1 | 12/2002 | Bergsten ..................... 711/162 |
| 6,502,205 B1 | 12/2002 | Yanai et al. .................... 714/7 |
| 6,513,097 B1 | 1/2003 | Beardsley et al. ........... 711/113 |
| 6,745,212 B2 * | 6/2004 | Kishi et al. .................. 707/204 |
| 6,779,058 B2 * | 8/2004 | Kishi et al. .................... 710/60 |
| 2003/0004980 A1 | 1/2003 | Kishi et al. .................. 707/204 |
| 2005/0066116 A1 * | 3/2005 | Bello et al. .................. 711/111 |

* cited by examiner

*Primary Examiner*—Robert Beausoliel
*Assistant Examiner*—Amine Riad
(74) *Attorney, Agent, or Firm*—Dale F. Regelman; Chandler & Udall, LLP

(57) ABSTRACT

A method for peer-to-peer system recovery, where the peer-to-peer system comprises a plurality of virtual tape controllers in communication with a first virtual tape server and with a second virtual tape server. The method generates a shutdown key, saves that shutdown key in each of the plurality of virtual tape controllers, and takes both virtual tape servers out of operation. Subsequently, the method returns one of the virtual tape servers to operation. Each virtual tape controller decides whether to place that operational virtual tape server on-line, and determines if the number of virtual tape controllers electing to place the operational virtual tape server on-line is greater than a pre-determined VTC agreement threshold. If the number of virtual tape controllers electing to place the operational virtual tape server on-line is greater than the VTC agreement threshold, then the method places the peer-to-peer system on-line using only the operational virtual tape server.

25 Claims, 5 Drawing Sheets

METHOD FOR PEER-TO-PEER SYSTEM RECOVERY

FIELD OF THE INVENTION

Applicant's invention relates to an apparatus and method for peer-to-peer data processing system recovery after a subsystem failure or shutdown.

BACKGROUND OF THE INVENTION

In hierarchical computer storage systems, fast and intensively used storage are paired with arrays of slower and less frequently accessed data devices. One example of high-speed, expensive memory is a direct access storage device file buffer (DASD). Slower storage devices include tape drives and disk drive arrays, which are less expensive than a DASD.

One such hierarchical storage system is a virtual tape storage system. Such a virtual tape storage system may include, for example, one or more virtual tape servers ("VTS") in combination with one or more data storage and retrieval systems, such as the IBM TotalStorage® 3494 Enterprise Tape Library. During operation, each virtual tape storage system is communicating data from one or more hosts, and is providing data to a second VTS for copying.

Data disaster recovery solutions include various "peer-to-peer" copy routines where data is backed-up not only remotely, but also continuously (either synchronously or asynchronously). In order to communicate duplexed data from one host processor to another host processor, or from one storage controller to another storage controller, or some combination thereof, a substantial amount of control data is required for realizing the process. A high overhead, however, can interfere with a secondary site's ability to keep up with a primary site's processing, thus threatening the ability of the secondary site to be able to recover the primary in the event a disaster occurs.

Disaster recovery protection for the typical data processing system requires that primary data stored on primary DASDs be backed-up at a secondary or remote location. The physical distance separating the primary and secondary locations can be set depending upon the level of risk acceptable to the user, and can vary from several kilometers to thousands of kilometers.

Using prior art methods, in the case where, if the peer-to-peer subsystems, i.e. both virtual tape servers, are shutdown for normal service, and for some reason only one of those virtual tape servers becomes operational, then the peer-to-peer cluster must wait until both tape servers are again operational before going online to the host computer. Therefore using these prior art methods, if a second virtual tape server fails while the first virtual tape server is shutdown for maintenance, then the entire peer-to-peer system becomes unavailable until both virtual tape servers are again operational.

What is needed is a method to distribute information about the status of a peer-to-peer data storage system across a plurality of system components such that the system itself can use that stored system information to return to operation even if all the virtual tape servers are not operational.

SUMMARY OF THE INVENTION

Applicants' invention includes an apparatus and method for peer-to-peer system recovery, where the peer-to-peer system comprises a plurality of virtual tape controllers in communication with a first virtual tape server and with a second vial tape server. The method generates a shutdown key and saves that shutdown key in each of the operational virtual tape controllers and virtual tape servers. The method then takes the first virtual tape server out of operation at a first time. The method takes the second virtual tape server out of operation at a second time, and brings the second virtual tape server in operation at a third time, where the third time is subsequent to the first time and the second time.

The method determines if the first virtual tape server is in operation at the third time. If the first virtual tape server is not in operation at the third time, then the method sets a VTC agreement threshold, and determines by each virtual tape controller whether to place the second virtual tape server on-line. The method then determines if the number of virtual tape controllers electing to place the second virtual tape server on-line is greater than the VTC agreement threshold. If the number of virtual tape controllers electing to place the second virtual tape server on-line is greater than the VTC agreement threshold, then the method places the peer-to-peer system on-line with only the second virtual tape server in operation.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
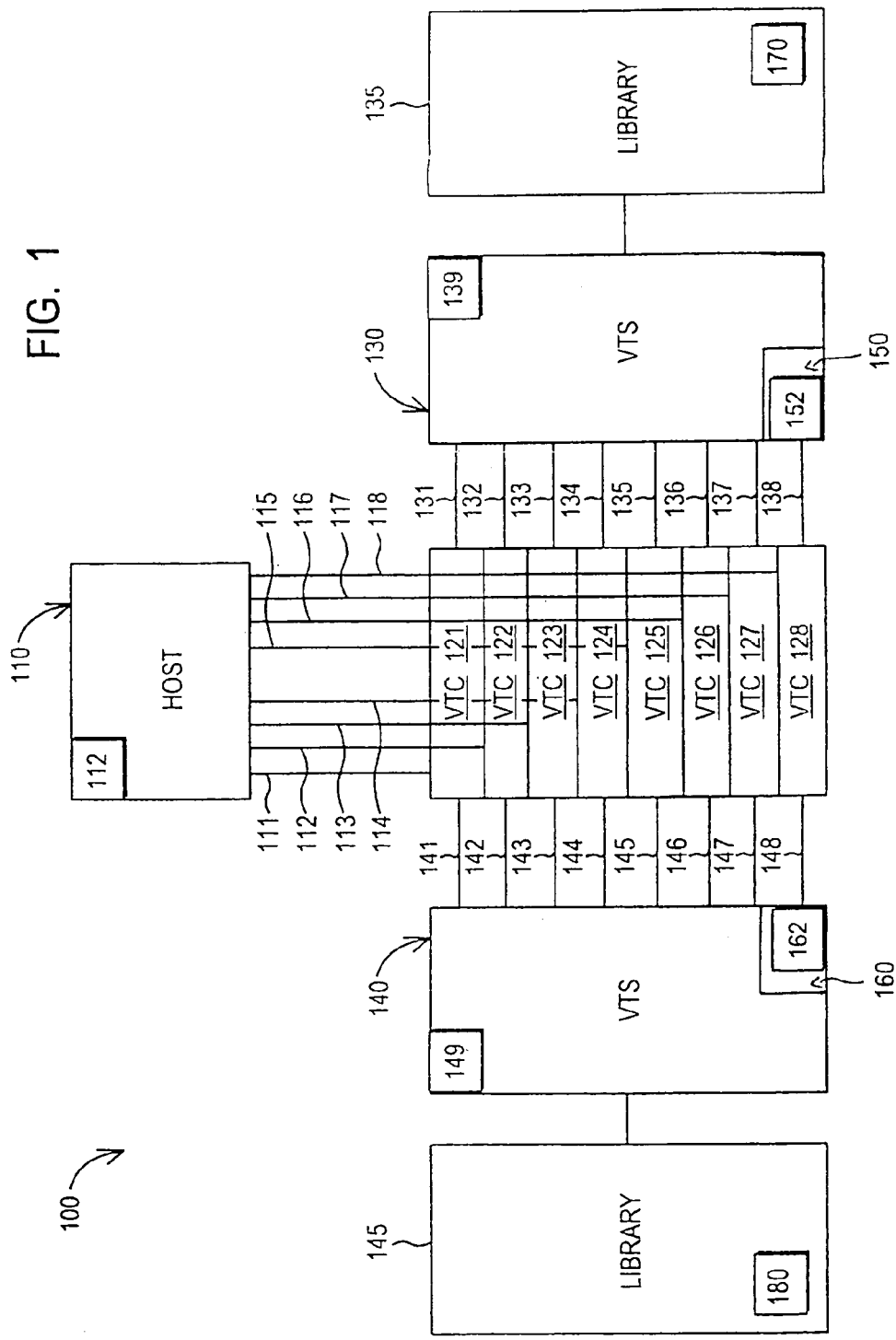
FIG. 1 is a block diagram showing Applicants' peer-to-peer data storage system.

Referring now to FIG. 1, Applicants' data storage and retrieval system 100 includes host computer 110, control unit 120, virtual tape server 130, virtual tape server 140, media library 135, and media library 145. In certain embodiments, library 135 and library 145 each comprise an IBM TotalStorage® 3494 Enterprise Tape Library.

Host computer 110 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark of IBM Corporation, and MVS is a trademark of IBM Corporation; UNIX is a registered trademark in the United States and other countries licensed exclusively through The Open Group.) In certain embodiments, host computer 110 includes a storage management program 112. The storage management program 112 in the host computer 110 may include the functionality of storage management type programs known in the art that manage the transfer of data to a data storage and retrieval system, such as the IBM DFSMS implemented in the IBM MVS operating system.

Storage management program 112 may include known storage management program functions, such as recall and migration. The storage management program 112 may be implemented within the operating system of the host computer or as a separate, installed application program. Alternatively, storage management program 112 may include device drivers, backup software, and the like.

Control unit 120 comprises a plurality of individual virtual tape controllers, such as virtual tape controllers 121, 122, 123, 124, 125, 126, 127, and 128. Each of virtual tape controllers 121, 122, 123, 124, 125, 126, 127, and 128, comprises a memory. Host computer 110 communicates with virtual tape controller 121 via communication link 111. Host computer 110 communicates with virtual tape controller 121 via communication link 111. Host computer 110 communicates with virtual tape controller 122 via communication link 112. Host computer 110 communicates with virtual tape controller 123 via communication link 113. Host computer 110 communicates with virtual tape controller 124 via communication link 114. Host computer 110 communicates with virtual tape controller 125 via communication link 115. Host computer 110 communicates with virtual tape controller 126 via communication link 116. Host computer 110 communicates with virtual tape controller 127 via communication link 117. Host computer 110 communicates with virtual tape controller 128 via communication link 118.

Communication links 111, 112, 113, 114, 115, 116, 117, and 118, are each selected from the group consisting of a serial interconnection, such as RS-232 or RS-422, an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, or other interconnections and/or protocols as is known to those of skill in the art.

VTS 130 comprises controller 139, computer readable medium 150, and computer program product 152. VTS 140 comprises controller 149, computer readable medium 160, and computer program product 162. Library 135 comprises operator panel 170. Library 145 comprises operator panel 180.

VTC 121 communicates with VTS 130 via communication link 131, and with VTS 140 via communication link 141. VTC 122 communicates with VTS 130 via communication link 132, and with VTS 140 via communication link 142. VTC 123 communicates with VTS 130 via communication link 133, and with VTS 140 via communication link 143. VTC 124 communicates with VTS 130 via communication link 134, and with VTS 140 via communication link 144. VTC 125 communicates with VTS 130 via communication link 135, and with VTS 140 via communication link 145. VTC 126 communicates with VTS 130 via communication link 136, and with VTS 140 via communication link 146. VTC 127 communicates with VTS 130 via communication link 137, and with VTS 140 via communication link 147. VTC 128 communicates with VTS 130 via communication link 138, and with VTS 140 via communication link 148.

Communication links 131, 132, 133, 134, 135, 136, 137, 138, 141, 142, 143, 144, 145, 146, 147, 148, are each selected from the group consisting of a serial interconnection, such as RS-232 or RS-422; an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, or other interconnections and/or protocols as is known to those of skill in the art.

Figure 2:
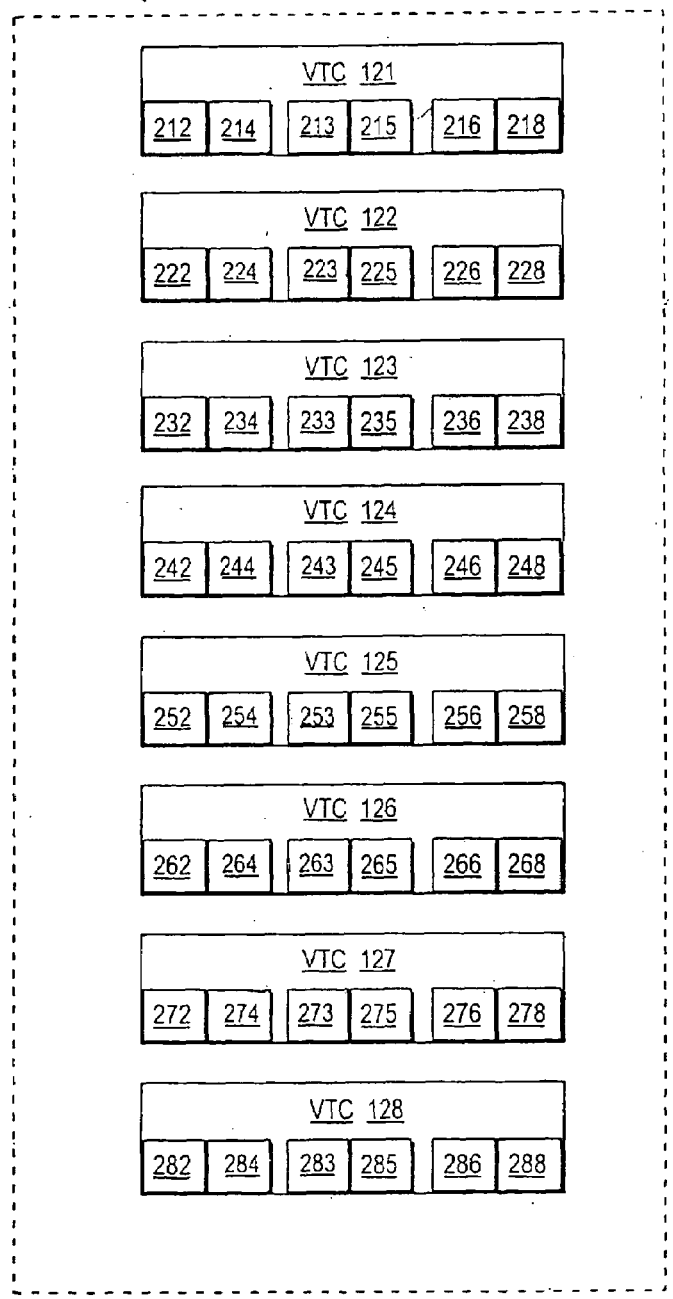
FIG. 2 is a block diagram showing the components comprising Applicants' virtual tape controller.

Referring now to FIG. 2, control unit 120 illustrates eight virtual tape controllers, namely VTC 121, VTC 122, VTC 123, VTC 124, VTC 125, VTC 126, VTC 127, and VTC 128. Each virtual tape controller includes two I/O adapters, namely I/O adapters 212, 214, 222, 224, 232, 234, 242, 244, 252, 254, 262, 264, 272, 274, 282, and 284. Each virtual tape controller includes a processor, such as processor 216, 226, 236, 246, 256, 266, 276, and 286.

Each virtual tape controller comprises a computer readable medium, such as computer readable media 213, 223, 233, 243, 253, 263, 273, and 283. Each virtual tape controller comprises a computer program product, such as computer program product 215, 225, 235, 245, 255, 265, 275, and 285.

Each virtual tape controller includes one or more memory devices, such as memory 218, 228,238,248,258,268, 278, and 288. Memory devices 218,228,238, 248, 258, 268, 278, and 288, are each selected from the group consisting of RAM memory, one or more DASDs, one or more hard disks, one or more electronic storage devices, and combinations thereof. By electronic storage device, Applicants mean a device such as a PROM, EPROM, EEPROM, Flash PROM, compactflash, smartmedia, and the like.

In certain embodiments, the virtual tape controllers do not contain their own processors and/or memory. Instead, control unit 120 includes processor 292 and memory 294 which are shared between the virtual tape controllers.

Figure 3:
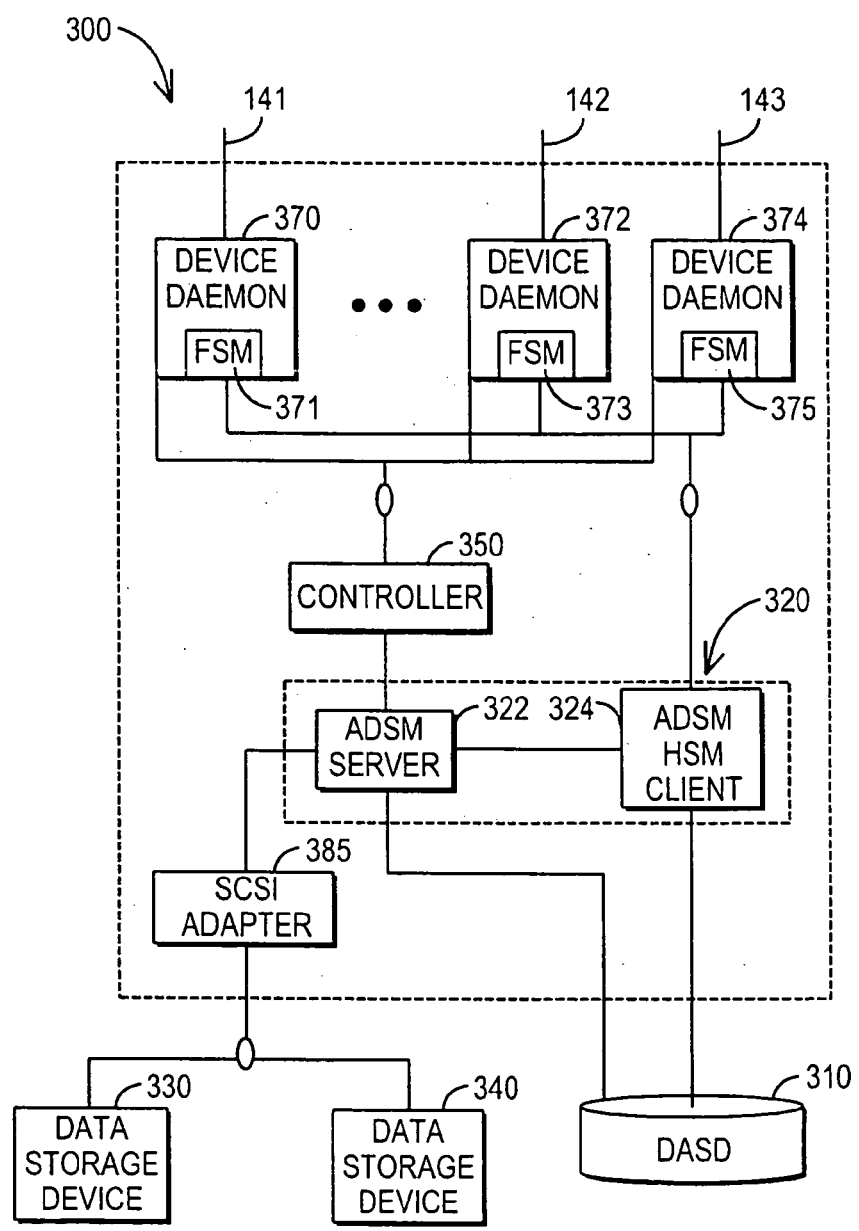
FIG. 3 is a block diagram showing the components of Applicants' virtual tape server.

Referring now to FIG. 3, virtual tape server 300 ("VTS") 300 communicates with one or more hosts and with one or more virtual tape controllers via daemons 370, 372, and 374. In the illustrated embodiment of FIGS. 1 and 3, daemon 370 comprises a virtual device communicating with, for example, VTC 121 via communication link 141. In the illustrated embodiment of FIGS. 1 and 3, daemon 372 comprises a virtual device communicating with, for example, VTC 122 via communication link 142. In the illustrated embodiment of FIGS. 1 and 3, daemon 374 comprises a virtual device communicating with VTC 123 via communication link 143.

VTS 300 also communicates with direct access storage device (DASD) 310, and a plurality of data storage devices 330 and 340. In certain embodiments, data storage devices 330 and 340 are disposed within one or more data storage and retrieval systems. In certain embodiments, DASD 310 is integral with host 110 (FIG. 1). In certain embodiments, DASD 310 is integral with VTS 300. In certain embodiments, DASD 310 is integral with a data storage and retrieval system. In certain embodiments, DASD 310 is external to host 110, VTS 300, and the one or more data storage and retrieval systems in communication with VTS 300.

VTS 300 further includes storage manager 320, such as the IBM Adstar® Distributed Storage Manager. Storage manager 320 controls the movement of data from DASD 310 to information storage media mounted in data storage devices 330 and 340. In certain embodiments, storage manager 320 includes an ADSM server 322 and an ADSM hierarchical storage manager client 324. Alternatively, server 322 and client 324 could each comprise an ADSM system. Information from DASD 310 is provided to data storage devices 330 and 340 via ADSM server 322 and SCSI adapter 385.

VTS 300 further includes autonomic controller 350. Autonomic controller 350 controls the operations of DASD 310 through the hierarchical storage manager (HSM) client 324, and the transfer of data between DASD 310 and data storage devices 330 and 340.

Figure 4:
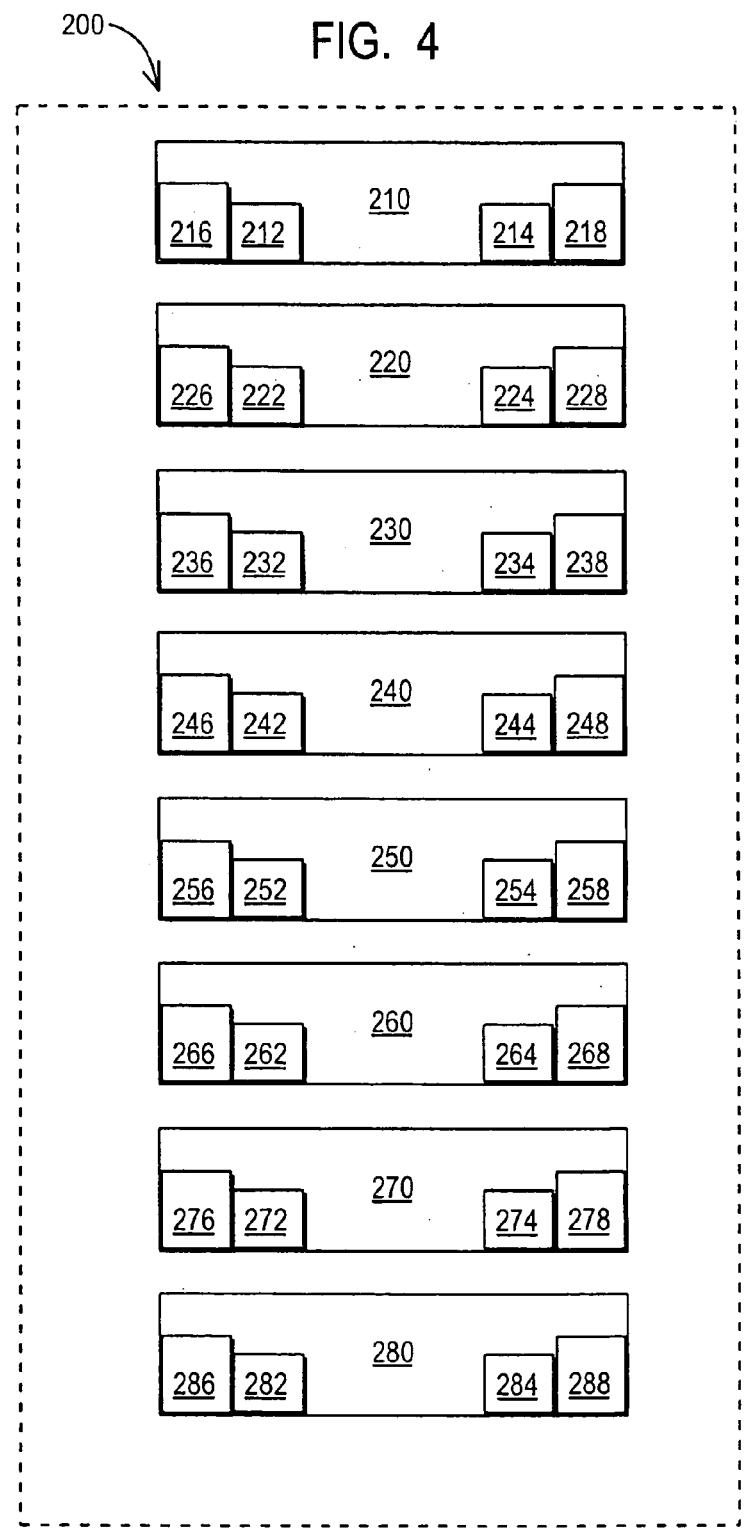
FIG. 4 is a flow chart summarizing the steps in a first embodiment of Applicants' method.
Figure 5:
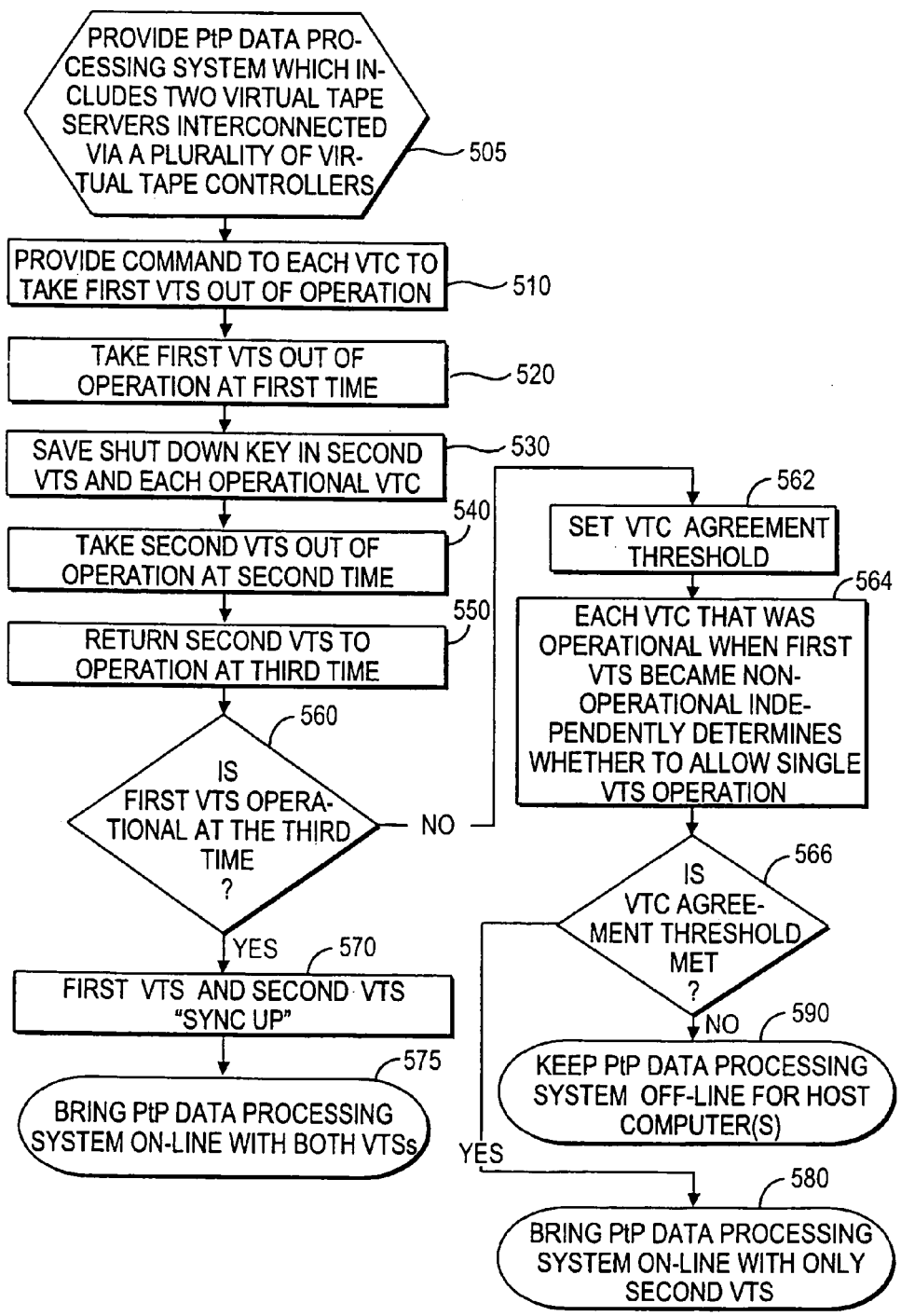
FIG. 5 is a flow chart summarizing the steps in a second embodiment of Applicants' method.

In one embodiment, Applicants' method saves a shutdown key in each operational VTS and VTC in anticipation of taking the entire system off-line for maintenance, repair, upgrade, and the like. FIG. 4 summarizes the steps of the embodiment. In another embodiment, Applicants' method saves a shutdown key in each operational VTS and VTC in anticipation of taking only one VTS off-line. FIG. 5 summarizes the steps of this embodiment.

In order to perform service on one or both VTS, such as VTS 130 (FIG. 1) and/or VTS 140 (FIG. 1), those one or more VTSs are placed into a Service Prep mode. In certain embodiments, a command is issued to each VTC to both place VTSs in Service Prep mode, i.e. to take VTS 130 and VTS 140 out of operation. After the service action is complete, the VTCs take VTS 130 and/or VTS 140 out of Service Prep mode, i.e. return those one or more VTSs to operation. In certain embodiments, a command is issued to each VTC to bring the one or more VTSs out of Service Prep mode.

Using prior art methods, if for any reason one of the VTSs does not properly return to operation, then the entire system 100 remains unavailable until both VTSs are again operational. Using Applicants' method, however, system 100 may be placed on-line after the service on both VTSs is completed even if one of those VTSs remains non-operational. FIG. 4 summarizes the steps of one embodiment of Applicants' method.

Referring now to FIG. 4, in step 410 the method provides a peer-to-peer data processing system comprising at least two virtual tape servers ("VTSs"), where those two virtual tape servers are interconnected by a plurality of virtual tape controllers ("VTCs").

In step 420, each VTC generates and saves a shut down key regarding the status of both VTSs. In certain embodiments, such a shutdown key is continuously generated and saved. In certain embodiments, such a shutdown key is generated and saved only in anticipation of bringing the system down for service.

In certain embodiments, step 420 is performed by a processor disposed in each VTC, such as one or more of processors 216 (FIG. 2), 226 (FIG. 2), 236 (FIG. 2), 246 (FIG. 2), 256 (FIG. 2), 266 (FIG. 2), 276 (FIG. 2), and 286 (FIG. 2). In certain embodiments, step 420 is performed by a controller disposed control unit 120, such as controller 292 (FIG. 2).

In certain embodiments, the shutdown key of step 410 is saved in a memory device disposed in each VTC, such as one or more of memory devices 218 (FIG. 2), 228 (FIG. 2), 238 (FIG. 2), 248 (FIG. 2), 258 (FIG. 2), 268 (FIG. 2), 278 (FIG. 2), and 288 (FIG. 2). In certain embodiments, the shutdown key of step 410 is saved in a memory device disposed in control unit 120, such as memory 294 (FIG. 2).

In step 430, Applicants' method provides a command to each VTC to take the first VTS, such as VTS 130 (FIG. 1), and the second VTS, such as VTS 140 (FIG. 1), off-line. After taking the both VTSs off-line, system 100 is no longer available for use by one or more interconnected host computers.

In certain embodiments, step 430 is performed by a host computer, such as host computer 110 (FIG. 1). In certain embodiments, step 430 is performed by a system user via an operator panel, such as operator panel 137 (FIG. 1)/147 (FIG. 1), disposed library 135 (FIG. 1)/145 (FIG. 1), respectively.

In certain embodiments, the command of step 430 specifies a mode for taking the first VTS off-line. In certain embodiments, the specified mode comprises a "normal mode" wherein the first VTS completes all pending copy jobs prior to being taken off-line. In certain embodiments, the specified mode comprises an "expedite mode" wherein the first VTS increases its copy bandwidth, i.e. the bandwidth between the first VTS and the second VTS, to expedite the copying of all pending copy jobs. In certain embodiments, the specified mode comprises an "immediate mode" wherein the first VTS is taken off-line prior to completing all pending copy jobs. In certain embodiments, the specified mode comprises a "force mode" wherein the first VTS performs operations whatsoever prior to being taken off-line.

In certain embodiments, the command of step 430 is provided to each VTC disposed in control unit 120. In certain embodiments, the command of step 410 is provided to one VTC which broadcasts that command to the remaining VTCs.

In certain embodiments, the shutdown key of step 410 includes the specified mode of step 430. In certain embodiments, the shutdown key of step 410 comprises the operational status of the both VTSs when those VTSs were taken off-line.

In step 440, Applicants' method at a first time takes both VTSs off-line. In certain embodiments, step 440 is performed by controllers disposed in those VTSs, such as controllers 139 (FIG. 1) and 149 (FIG. 1). In certain embodiments, step 440 is performed by a processor disposed in each VTC, such as one or more of processors 216 (FIG. 2), 226 (FIG. 2), 236 (FIG. 2), 246 (FIG. 2), 256 (FIG. 2), 266 (FIG. 2), 276 (FIG. 2), and 286 (FIG. 2). In certain embodiments, step 440 is performed by a controller disposed control unit 120 (FIG. 1), such as controller 292 (FIG. 2).

In step 450, Applicants' method at a second time provides a command to each VTC to bring both VTSs back on-line. In certain embodiments, the command of step 450 is provided to each VTC disposed in control unit 120. In certain embodiments, the command of step 450 is provided to one VTC which broadcasts that command to the remaining VTCs.

In certain embodiments, step 450 is performed by controllers disposed in the VTSs, such as controllers 139/149. In certain embodiments, step 450 is performed by a processor disposed in each VTC, such as one or more of processors 216 (FIG. 2), 226 (FIG. 2), 236 (FIG. 2), 246 (FIG. 2), 256 (FIG. 2), 266 (FIG. 2), 276 (FIG. 2), and 286 (FIG. 2). In certain embodiments, step 440 is performed by a controller disposed control unit 120 (FIG. 1), such as controller 292 (FIG. 2).

In step 460, Applicants' method determines if both the VTSs were returned to operation. In certain embodiments, step 460 is performed by controllers disposed in the VTSs. In certain embodiments, step 460 is performed by a processor disposed in each VTC, such as one or more of processors 216 (FIG. 2), 226 (FIG. 2), 236 (FIG. 2), 246 (FIG. 2), 256 (FIG. 2), 266 (FIG. 2), 276 (FIG. 2), and 286 (FIG. 2). In certain embodiments, step 460 is performed by a controller disposed control unit 120 (FIG. 1), such as controller 292 (FIG. 2).

If Applicants' method determines in step 460 that both VTSs were returned to operation and are operational, then the method transitions from step 460 to step 470 wherein the method places Applicants' peer-to-peer data processing system on-line with the one or more host computers, where the data processing system includes two operational virtual tape servers.

If Applicants' method determines in step 460 that one of the two VTSs did not return to operation, then the method transitions from step 460 to step 462 wherein the method sets a VTC agreement threshold. Step 462 may be performed at any time prior to performing step 464.

The VTC agreement threshold of step 462 comprises the minimum percentage/number of VTCs that must elect to place one VTS back on-line even if the second VTS is non-operational. In certain embodiments, the VTC agreement threshold of step 462 comprises a percentage of the VTCs operational at the time the second VTS became non-operational. In certain embodiments, the VTC agreement threshold of step 462 is greater than fifty percent.

In certain embodiments, the VTC agreement threshold of step 462 comprises a certain number of VTCs, where each of those VTCs must have been operational at the time the system was taken off-line.

In certain embodiments, the VTC agreement threshold is set in firmware disposed the memory portion of each VTC. In certain embodiments, the VTC agreement threshold is set in firmware disposed in each VTS.

In step 464, each VTC that was operational when the system was taken off-line independently determines, based upon the shutdown key saved in step 420, whether to place one VTS on-line even if the second VTS is non-operational.

For example, if the shutdown key saved in each operational VTC and in the now-operational VTS are the same, then each VTC in step 464 would elect to place the one operational VTS on-line, and in step the method would determine that the VTC agreement threshold is met.

Step 464 further includes reporting by each VTC its determination regarding whether to place the operational VTS on-line. This reporting may comprise any signaling method known to those of skill in the art. For example, each VTC may send a message to each of the remaining VTCs setting forth that VTC's determination of step 464. Alternatively, each VTC may poll the other VTCs for their individual determinations of step 464.

Applicants' method transitions from step 464 to step 466 wherein the method determines if the number of VTCs electing in step 466 to place the operational VTS on-line is greater than the VTC agreement threshold of step 462. In certain embodiments, step 466 is performed by a processor disposed in each VTC, such as one or more of processors 216 (FIG. 2), 226 (FIG. 2), 236 (FIG. 2), 246 (FIG. 2), 256 (FIG. 2), 266 (FIG. 2), 276 (FIG. 2), and 286 (FIG. 2). In certain embodiments, step 466 is performed by a controller disposed control unit 120 (FIG. 1), such as controller 292 (FIG. 2).

If Applicants' method determines in step 466 that the VTC agreement threshold is met, i.e. the number of VTCs electing in step 466 to place the operational VTS on-line is greater than the VTC agreement threshold of step 462, then the method transitions from step 466 to step 480 wherein the method places Applicants' peer-to-peer data processing system on-line to the host computer(s) using only the operational VTS. Alternatively, if Applicants' method determines in step 466 that the VTC agreement threshold is not met, then the method transitions from step 466 to step 490 wherein the method keeps Applicants' peer-to-peer data processing system off-line to the host computer(s).

FIG. 5 summarizes the steps of Applicant's method when one of the two VTS is taken off-line for service, repair, maintenance, upgrade, and the like. Referring now to FIG. 5, in step 505 the method provides a peer-to-peer data processing system comprising at least two virtual tape servers ("VTSs"), where those two virtual tape servers are interconnected by a plurality of virtual tape controllers ("VTCs").

In step 510, Applicants' method provides a command to each VTC to take the first VTS, such as VTS 130 (FIG. 1) off-line. After taking the first VTS off-line, that first VTS in no longer available for use by one or more interconnected host computers.

In certain embodiments, step 510 is performed by a host computer, such as host computer 110 (FIG. 1). In certain embodiments, step 510 is performed by a system user via an operator panel, such as operator panel 137 (FIG. 1)/147 (FIG. 1), disposed library 135 (FIG. 1)/145 (FIG. 1), respectively.

In certain embodiments, the command of step 510 specifies a mode for taking the first VTS off-line. In certain embodiments, the specified mode comprises a "normal mode" wherein the first VTS completes all pending copy jobs prior to being taken off-line. In certain embodiments, the specified mode comprises an "expedite mode" wherein the first VTS increases its copy bandwidth, i.e. the bandwidth between the first VTS and the second VTS, to expedite the copying of all pending copy jobs. In certain embodiments, the specified mode comprises an "immediate mode" wherein the first VTS is taken off-line prior to completing all pending copy jobs. In certain embodiments, the specified mode comprises a "force mode" wherein the first VTS performs operations whatsoever prior to being taken off-line.

In certain embodiments, the command of step 510 is provided to each VTC disposed in control unit 120. In certain embodiments, the command of step 510 is provided to one VTC which broadcasts that command to the remaining VTCs.

In step 520, Applicants' method at a first time takes the first VTS off-line. In certain embodiments, step 530 is performed by a controller disposed in the first VTS, such as controller 139 (FIG. 1) disposed in VTS 130 (FIG. 1). In certain embodiments, step 520 is performed by a processor disposed in each VTC, such as one or more of processors 216 (FIG. 2), 226 (FIG. 2), 236 (FIG. 2), 246 (FIG. 2), 256 (FIG. 2), 266 (FIG. 2), 276 (FIG. 2), and 286 (FIG. 2). In certain embodiments, step 520 is performed by a controller disposed control unit 120 (FIG. 1), such as controller 292 (FIG. 2).

In step 530, each VTC generates and saves a shutdown key regarding the status of the first VTS. In certain embodiments, this shutdown key is continuously generated and saved. In certain embodiments, this shutdown key is generated and saved only in anticipation of taking one VTS, or both VTSs, off-line. In certain embodiments, the shutdown key of step 530 includes the specified mode of step 510. In certain embodiments, the shutdown key of step 530 includes a timestamp.

In certain embodiments, step 530 is performed by a processor disposed in each VTC, such as one or more of processors 216 (FIG. 2), 226 (FIG. 2), 236 (FIG. 2), 246 (FIG. 2), 256 (FIG. 2), 266 (FIG. 2), 276 (FIG. 2), and 286 (FIG. 2). In certain embodiments, step 530 is performed by a controller disposed control unit 120, such as controller 292 (FIG. 2).

In certain embodiments, the shutdown key of step 530 is saved in a memory device disposed in each VTC, such as one or more of memory devices 218 (FIG. 2), 228 (FIG. 2), 238 (FIG. 2), 248 (FIG. 2), 258 (FIG. 2), 268 (FIG. 2), 278

(FIG. 2), and 288 (FIG. 2). In certain embodiments, the shutdown key of step 530 is saved in a memory device disposed in control unit 120, such as memory 294 (FIG. 2).

In step 540, Applicants' method, at a second time subsequent to the first time, takes the second VTS out of operation. In certain embodiments, step 540 comprises a non-intentional cessation of operation of the second VTS, i.e. a failure of the second VTS. In other embodiments, step 540 comprises an intentional cessation of operation of the second VTS.

In certain embodiments, step 540 is performed by a controller disposed in the second VTS, such as controller 139 (FIG. 1) disposed in VTS 130 (FIG. 1). In certain embodiments, step 540 is performed by a processor disposed in each VTC, such as one or more of processors 216 (FIG. 2), 226 (FIG. 2), 236 (FIG. 2), 246 (FIG. 2), 256 (FIG. 2), 266 (FIG. 2), 276 (FIG. 2), and 286 (FIG. 2). In certain embodiments, step 540 is performed by a controller disposed control unit 120 (FIG. 1), such as controller 292 (FIG. 2).

In step 550, the second VTS is placed in operation at a third time, where the third time of step 550 is subsequent to the first time of step 530 and the second time of step 540. In certain embodiments, step 550 is performed by a controller disposed in the second VTS, such as controller 139 (FIG. 1) disposed in VTS 130 (FIG. 1).

In step 560, Applicants' method determines if the first VTS, such as VTS 130 (FIG. 1), is operational at the third time of step 550. In certain embodiments, step 560 is performed by a controller disposed in the second VTS, such as controller 149 (FIG. 1) disposed in VTS 140 (FIG. 1). In certain embodiments, step 560 is performed by a processor disposed in each VTC, such as one or more of processors 216 (FIG. 2), 226 (FIG. 2), 236 (FIG. 2), 246 (FIG. 2), 256 (FIG. 2), 266 (FIG. 2), 276 (FIG. 2), and 286 (FIG. 2). In certain embodiments, step 460 is performed by a controller disposed control unit 120 (FIG. 1), such as controller 292 (FIG. 2).

If Applicants' method determines in step 560 that the first VTS is operational at the third time of step 550, then the method transitions from step 560 to step 570 wherein the two VTSs "sync up," i.e. compare copy tokens to ensure that all pending copy jobs are completed.

If Applicants' method determines in step 560 that the first VTS is not in operation at the third time of step 550, then the method transitions from step 560 to step 562 wherein the method sets a VTC agreement threshold. Step 562 may be performed at any time prior to performing step 564.

The VTC agreement threshold of step 562 comprises the minimum percentage/number of VTCs that must elect to place the second VTS back on-line even if the first VTS is non-operational. In certain embodiments, the VTC agreement threshold of step 562 comprises a percentage of the VTCs operational at the time the second VTS became non-operational. In certain embodiments, the VTC agreement threshold of step 452 is greater than fifty percent. In certain embodiments, the VTC agreement threshold of step 562 comprises a certain number of VTCs, where each of those VTCs must have been operational at the time the second VTS became non-operational.

In certain embodiments, the VTC agreement threshold is set in firmware disposed the memory portion of each VTC. In certain embodiments, the VTC agreement threshold is set in firmware disposed in each VTS.

In step 564, each VTC that was operational when the first VTS became non-operational independently determines, based upon the shutdown key saved in step 530, whether to place the second VTS on-line even if the first VTS is non-operational.

Step 564 further includes reporting by each VTC its determination regarding whether to place the first VTS on-line. This reporting may comprise any signaling method known to those of skill in the art. For example, each VTC may send a message to each of the remaining VTCs setting forth that VTC's determination of step 564. Alternatively, each VTC may poll the other VTCs for their individual determinations of step 564.

Applicants' method transitions from step 564 to step 566 wherein the method determines if the number of VTCs electing in step 466 to place the second VTS on-line is greater than the VTC agreement threshold of step 562. In certain embodiments, step 566 is performed by a processor disposed in each VTC, such as one or more of processors 216 (FIG. 2), 226 (FIG. 2), 236 (FIG. 2), 246 (FIG. 2), 256 (FIG. 2), 266 (FIG. 2), 276 (FIG. 2), and 286 (FIG. 2). In certain embodiments, step 566 is performed by a controller disposed control unit 120 (FIG. 1), such as controller 292 (FIG. 2).

If Applicants' method determines in step 566 that the VTC agreement threshold is met, i.e. the number of VTCs electing in step 566 to place the second VTS on-line is greater than the VTC agreement threshold of step 562, then the method transitions from step 566 to step 580 wherein the method places Applicants' peer-to-peer data processing system on-line to the host computer(s) with only one VTS in operation. Alternatively, if Applicants' method determines in step 566 that the VTC agreement threshold is not met, then the method transitions from step 566 to step 590 wherein the method keeps Applicants' peer-to-peer data processing system off-line to the host computer(s).

In certain embodiments, individual steps recited in FIG. 4 and/or FIG. 5 may be combined, eliminated, or reordered.

Applicants' invention further includes an article of manufacture comprising a computer useable medium, such as computer useable medium 150 (FIG. 1), 160 (FIG. 1), 213 (FIG. 2), 223 (FIG. 2), 233 (FIG. 2), 243 (FIG. 2), 253 (FIG. 2), 263 (FIG. 2), 273 (FIG. 2), 283 (FIG. 2), and/or 296 (FIG. 2), having computer readable program code disposed therein for peer-to-peer system recovery after failed subsystem service by implementing some or all of the steps recited in FIG. 4 and/or FIG. 5.

Applicants' invention further includes a computer program product, such as computer program product 152 (FIG. 1), 162 (FIG. 1), 215 (FIG. 2), 225 (FIG. 2), 235 (FIG. 2), 245 (FIG. 2), 255 (FIG. 2), 265 (FIG. 2), 275 (FIG. 2), 285 (FIG. 2), and/or 298 (FIG. 2), usable with a programmable computer processor having computer readable program code embodied therein method for peer-to-peer system recovery after failed subsystem service by implementing some or all of the steps recited in FIG. 4 and/or FIG. 5.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for peer-to-peer system recovery, wherein said peer-to-peer system comprises a plurality of virtual tape controllers in communication with a first virtual tape server and a second virtual tape server, comprising the steps of:

generating a shutdown key regarding the status of said first virtual tape server;

saving said shutdown key in each of said plurality of virtual tape controllers;
taking said first virtual tape server out of operation at a first time;
taking said second virtual tape server out of operation at a second time;
placing said second virtual tape server in operation at a third time;
determining if said first virtual tape is in operation at said third time;
operative if said first virtual tape is not in operation at said third time:
setting a VTC agreement threshold;
determining by each virtual tape controller whether to place said second virtual tape server on-line;
determining if the number of virtual tape controllers electing to place said second virtual tape server on-line is greater than said VTC agreement threshold;
operative if the number of virtual tape controllers electing to place said second virtual tape server on-line is greater than said VTC agreement threshold, placing said peer-to-peer system on-line with only said second virtual tape server in operation.

2. The method of claim 1, further comprising the step of operative if the number of virtual tape controllers electing to place said second virtual tape server on-line is not greater than said VTC agreement threshold, keeping said peer-to-peer system off-line.

3. The method of claim 1, further comprising the step of providing a command to take said first virtual tape server out of operation.

4. The method of claim 3, further comprising the steps of:
providing said command to a first one of said plurality of virtual tape controllers;
providing said command from said first virtual tape controller to the remaining virtual tape controllers.

5. The method of claim 3, wherein said first command comprises a command execution mode.

6. The method of claim 5, wherein said command execution mode is selected from the group consisting of normal mode, expedite mode, immediate mode, and forced mode.

7. A method for peer-to-peer system recovery, wherein said peer-to-peer system comprises a plurality of virtual tape controllers in communication with a first virtual tape server and a second virtual tape server, comprising the steps of:
generating a shutdown key regarding the status of said first virtual tape server and said second virtual tape server;
saving said shutdown key in each of said plurality of virtual tape controllers;
taking said first virtual tape server and said second virtual tape server out of operation at a first time;
attempting at a second time to return said first virtual tape server and said second virtual tape server to operation;
determining if both said first VTS and said second VTS are returned to operation at said second time;
operative if both said first VTS and said second VTS are returned to operation at said second time, placing said peer-to-peer system on-line with both said first virtual tape server and said second virtual tape server in operation.

8. The method of claim 7, further comprising the steps of:
operative if one of said first VTS and said second VTS is operational and the other remains out of operation at said second time, determining by each virtual tape controller whether to place the operational virtual tape server on-line;
determining if the number of virtual tape controllers electing to place said operational virtual tape server on-line is greater than said VTC agreement threshold;
operative if the number of virtual tape controllers electing to place said operational virtual tape server on-line is greater than said VTC agreement threshold, placing said peer-to-peer system on-line with only said operational virtual tape server in operation.

9. The method of claim 8, further comprising the step of operative if the number of virtual tape controllers electing to place said operational virtual tape server on-line is not greater than said VTC agreement threshold, keeping said peer-to-peer system off-line.

10. An article of manufacture comprising a computer readable medium having computer readable program code disposed therein for peer-to-peer system recovery, wherein said peer-to-peer system comprises a plurality of virtual tape controllers, including said article of manufacture, in communication with a first virtual tape server and with a second virtual tape server, the computer readable program code comprising a series of computer readable program steps to effect:
generating a shutdown key regarding the status of said first virtual tape server;
saving said shutdown key;
taking said first virtual tape server out of operation at a first time;
taking said second virtual tape server out of operation at a second time;
placing said second virtual tape server in operation at a third time;
determining if said first virtual tape is in operation at said third time;
operative if said first virtual tape is not in operation at said third time:
setting a VTC agreement threshold;
determining whether to place said second virtual tape server on-line;
determining if the number of virtual tape controllers electing to place said second virtual tape server on-line is greater than said VTC agreement threshold;
operative if the number of virtual tape controllers electing to place said second virtual tape server on-line is greater than said VTC agreement threshold, placing said peer-to-peer system on-line with only said second virtual tape server in operation.

11. The article of manufacture of claim 10, said computer readable program code further comprising a series of computer readable program steps to effect keeping said peer-to-peer system off-line if the number of virtual tape controllers electing to place said second virtual tape server on-line is not greater than said VTC agreement threshold.

12. The article of manufacture of claim 10, said computer readable program code further comprising a series of computer readable program steps to effect providing said first command to the remaining virtual tape controllers.

13. The article of manufacture of claim 10, wherein said first command comprises a command execution mode.

14. The article of manufacture of claim 13, wherein said command execution mode is selected from the group consisting of normal mode, expedite mode, immediate mode, and forced mode.

15. An article of manufacture comprising a computer readable medium having computer readable program code disposed therein for peer-to-peer system recovery, wherein said peer-to-peer system comprises a plurality of virtual tape controllers, including said article of manufacture, in communication with a first virtual tape server and with a second virtual tape server, the computer readable program code comprising a series of computer readable program steps to effect:

generating a shutdown key regarding the status of said first virtual tape server and said second virtual tape server;

saving said shutdown key;

taking said first virtual tape server and said second virtual tape server out of operation at a first time;

attempting at a second time to return said first virtual tape server and said second virtual tape server to operation;

determining if both said first VTS and said second VTS are returned to operation at said second time;

operative if both said first VTS and said second VTS are returned to operation at said second time, placing said peer-to-peer system on-line with both said first virtual tape server and said second virtual tape server in operation.

16. The article of manufacture of claim 15, said computer readable program code further comprising a series of computer readable program steps to effect:

operative if one of said first VTS and said second VTS is operational and the other remains out of operation at said second time, determining whether to place the operational virtual tape server on-line;

determining if the number of virtual tape controllers electing to place said operational virtual tape server on-line is greater than said VTC agreement threshold;

operative if the number of virtual tape controllers electing to place said operational virtual tape server on-line is greater than said VTC agreement threshold, placing said peer-to-peer system on-line with only said operational virtual tape server in operation.

17. The article of manufacture of claim 16, said computer readable program code further comprising a series of computer readable program steps to effect operative if the number of virtual tape controllers electing to place said operational virtual tape server on-line is not greater than said VTC agreement threshold, keeping said peer-to-peer system off-line.

18. A computer program product embodied in a computer readable medium, wherein said computer program product is usable with a programmable computer processor for peer-to-peer system recovery, wherein said peer-to-peer system comprises a plurality of virtual tape controllers in communication with a first virtual tape server and with a second virtual tape server, comprising:

computer readable program code which causes said programmable computer processor to generate a shutdown key regarding the status of said first virtual tape server;

computer readable program code which causes said programmable computer processor to save said shutdown key;

computer readable program code which causes said programmable computer processor to receive a first command to take said first virtual tape server out of operation at a first time;

computer readable program code which causes said programmable computer processor to receive a second command to take said second virtual tape server out of operation at a second time;

computer readable program code which causes said programmable computer processor to receive a second command to bring said second virtual tape server back in operation at a third time;

computer readable program code which causes said programmable computer processor to determine if said first virtual tape is in operation at said third time;

computer readable program code which, if first second virtual tape is not in operation at said third time, causes said programmable computer processor to retrieve a VTC agreement threshold;

computer readable program code which, if said first virtual tape is not in operation at said third time, causes said programmable computer processor to determine whether to place said second virtual tape server on-line;

computer readable program code which, if said first virtual tape is not in operation at said third time, causes said programmable computer processor to determine if the number of virtual tape controllers electing to place said second virtual tape server on-line is greater than said VTC agreement threshold;

computer readable program code which, if said first virtual tape is not in operation at said third time and if the number of virtual tape controllers electing to place said second virtual tape server on-line is greater than said VTC agreement threshold, causes said programmable computer processor to place said peer-to-peer system on-line with only said second virtual tape server in operation.

19. The computer program product of claim 18, further comprising computer readable program code which, if said first virtual tape is not in operation at said third time and if the number of virtual tape controllers electing to place said second virtual tape server on-line is not greater than said VTC agreement threshold, causes said programmable computer processor to keep said peer-to-peer system off-line.

20. The computer program product of claim 18, further comprising computer readable program code which causes said programmable computer processor to provide said first command to the remaining virtual tape controllers.

21. The computer program product of claim 18, wherein said first command comprises a command execution mode.

22. The computer program product of claim 21, wherein said command execution mode is selected from the group consisting of normal mode, expedite mode, immediate mode, and forced mode.

23. A computer program product embodied in a computer readable medium, wherein said computer program product is usable with a programmable computer processor for peer-to-peer system recovery, wherein said peer-to-peer system comprises a plurality of virtual tape controllers in communication with a first virtual tape server and with a second virtual tape server, comprising:

computer readable program code which causes said programmable computer processor to generate a shutdown key regarding the status of said first virtual tape server and said second virtual tape server;

computer readable program code which causes said programmable computer processor to save said shutdown key;

computer readable program code which causes said programmable computer processor to take said first virtual tape server and said second virtual tape server out of operation at a first time;

computer readable program code which causes said programmable computer processor to attempt at a second time to return said first virtual tape server and said second virtual tape server to operation;

computer readable program code which causes said programmable computer processor to determine if both said first VTS and said second VTS are returned to operation at said second time;

computer readable program code which, if both said first VTS and said second VTS are returned to operation at said second time, causes said programmable computer processor to place said peer-to-peer system on-line with both said first virtual tape server and said second virtual tape server in operation.

24. The computer program product of claim 23, further comprising:

computer readable program code which, if one of said first VTS and said second VTS is operational and the other remains out of operation at said second time, causes said programmable computer processor to determine whether to place the operational virtual tape server on-line;

computer readable program code which causes said programmable computer processor to determine if the number of virtual tape controllers electing to place said operational virtual tape server on-line is greater than said VTC agreement threshold;

computer readable program code which, if the number of virtual tape controllers electing to place said operational virtual tape server on-line is greater than said VTC agreement threshold, causes said programmable computer processor to place said peer-to-peer system on-line with only said operational virtual tape server in operation.

25. The computer program product of claim 24, further comprising computer readable program code which, if the number of virtual tape controllers electing to place said operational virtual tape server on-line is not greater than said VTC agreement threshold, causes said programmable computer processor to keep said peer-to-peer system off-line.

* * * * *